(12) United States Patent
Shaw

(10) Patent No.: US 7,343,648 B2
(45) Date of Patent: Mar. 18, 2008

(54) SECURING STRAP ARRANGEMENT AND TENSIONER THEREFOR

(76) Inventor: Stephen James Shaw, 21 Woodlands Terrace, Swansea SA1 6BR (GB)

( * ) Notice: Subject to any disclaimer, the term of this patent is extended or adjusted under 35 U.S.C. 154(b) by 0 days.

(21) Appl. No.: 10/485,318

(22) PCT Filed: Aug. 1, 2001

(86) PCT No.: PCT/GB01/03444

§ 371 (c)(1),
(2), (4) Date: Jul. 19, 2004

(87) PCT Pub. No.: WO03/011637

PCT Pub. Date: Feb. 13, 2003

(65) Prior Publication Data

US 2004/0237264 A1   Dec. 2, 2004

(51) Int. Cl.
*A43C 11/00* (2006.01)

(52) U.S. Cl. ............ 24/68 CD; 24/265 H; 24/265 CD; 24/318; 24/71 TD

(58) Field of Classification Search ............... 24/298, 24/300, 301, 302, 265 H, 265 CD, 318, 319, 24/588, 68 CD, 71 TD
See application file for complete search history.

(56) References Cited

U.S. PATENT DOCUMENTS

| | | | | |
|---|---|---|---|---|
| 302,655 A | * | 7/1884 | Frank | 2/316 |
| 1,401,227 A | * | 12/1921 | Wyeth | 2/323 |
| 1,483,192 A | * | 2/1924 | Langgons | 2/338 |
| 1,657,365 A | * | 1/1928 | Bear | 24/498 |
| 1,803,214 A | * | 4/1931 | Siegel | 24/698.3 |
| 1,828,196 A | * | 10/1931 | McCann | 2/322 |
| 1,926,751 A | * | 9/1933 | Mix et al. | 2/332 |
| 2,051,173 A | * | 8/1936 | Leonard | 2/323 |
| 2,110,872 A | * | 3/1938 | Forstner | 2/339 |
| 2,137,563 A | * | 11/1938 | Caraway | 2/309 |
| 2,592,148 A | * | 4/1952 | Isaacs | 2/237 |
| 2,863,200 A | | 12/1958 | Miller et al. | 24/230 |
| 3,049,778 A | * | 8/1962 | Weckesser | 24/180 |
| D289,698 S | * | 5/1987 | Bates | D30/142 |
| 4,751,772 A | * | 6/1988 | Crowle | 24/170 |
| 5,005,827 A | * | 4/1991 | Steinbrecher | 482/16 |
| 5,042,113 A | * | 8/1991 | Severson et al. | 24/16 PB |
| 5,351,372 A | | 10/1994 | Ihara | 24/611 |
| 5,402,557 A | | 4/1995 | Dalen | 24/68 |
| 5,423,644 A | * | 6/1995 | First, Sr. | 410/100 |
| 5,615,811 A | * | 4/1997 | Bell et al. | 224/150 |
| 5,623,750 A | | 4/1997 | Nasin et al. | 24/68 |

(Continued)

FOREIGN PATENT DOCUMENTS

DE    G 94 07 461.5    5/1994

(Continued)

*Primary Examiner*—William L. Miller
(74) *Attorney, Agent, or Firm*—Gordon & Jacobson, PC

(57) ABSTRACT

A securing strap arrangement, typically for securing luggage or other items, has a resiliently extensible length portion, and a substantially non-resiliently extensible length portion including an arrangement for varying effective length of the non-resiliently extensible length portion. In a preferred embodiment, the arrangement includes a tensioner grip that stretches the extensible length portion, and a tension grip locator arranged such that the tensioner grip is releasably engageable with the tension grip locater in one of a plurality of location positions that are spaced apart in the longitudinal direction of the securing strap arrangement.

18 Claims, 5 Drawing Sheets

U.S. PATENT DOCUMENTS

| | | | |
|---|---|---|---|
| 5,845,370 A * | 12/1998 | Cohoon | 24/68 CD |
| 6,006,364 A * | 12/1999 | Newsom et al. | 2/323 |
| 6,014,794 A * | 1/2000 | McCoy | 24/300 |
| 6,397,865 B1 * | 6/2002 | Wilson et al. | 135/16 |
| 6,557,329 B2 * | 5/2003 | Schmidt | 54/85 |
| 6,637,077 B2 * | 10/2003 | Doty | 24/302 |
| 6,671,933 B1 * | 1/2004 | Friend et al. | 24/265 H |
| D491,168 S * | 6/2004 | Petrick | D14/218 |
| 6,748,727 B1 * | 6/2004 | Schulte | 54/47 |
| 6,755,383 B2 * | 6/2004 | Davis | 248/508 |
| 6,807,715 B1 * | 10/2004 | Blair | 24/16 PB |
| 2002/0138952 A1 * | 10/2002 | Chou | 24/300 |

FOREIGN PATENT DOCUMENTS

| | | |
|---|---|---|
| DE | 298 08 346 U1 | 9/1998 |
| DE | 201 06 392 U1 | 11/2001 |
| EP | 0 832 784 A1 | 1/1998 |

\* cited by examiner

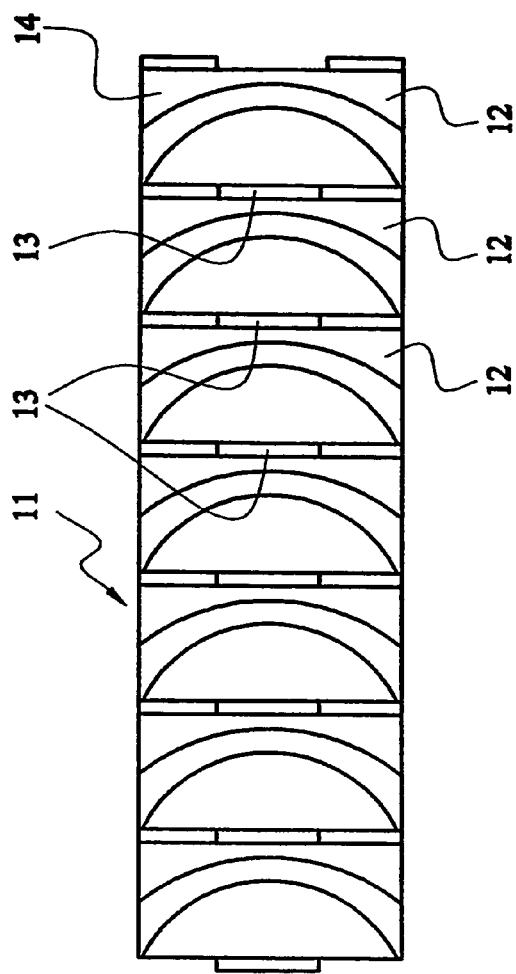
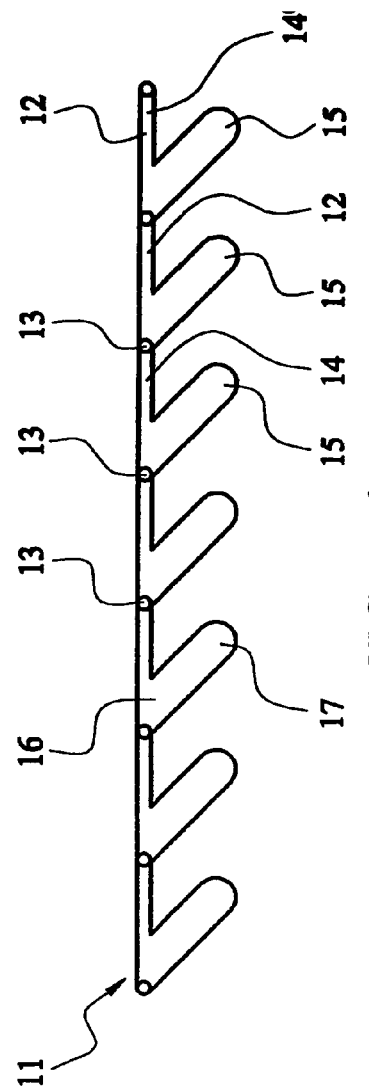
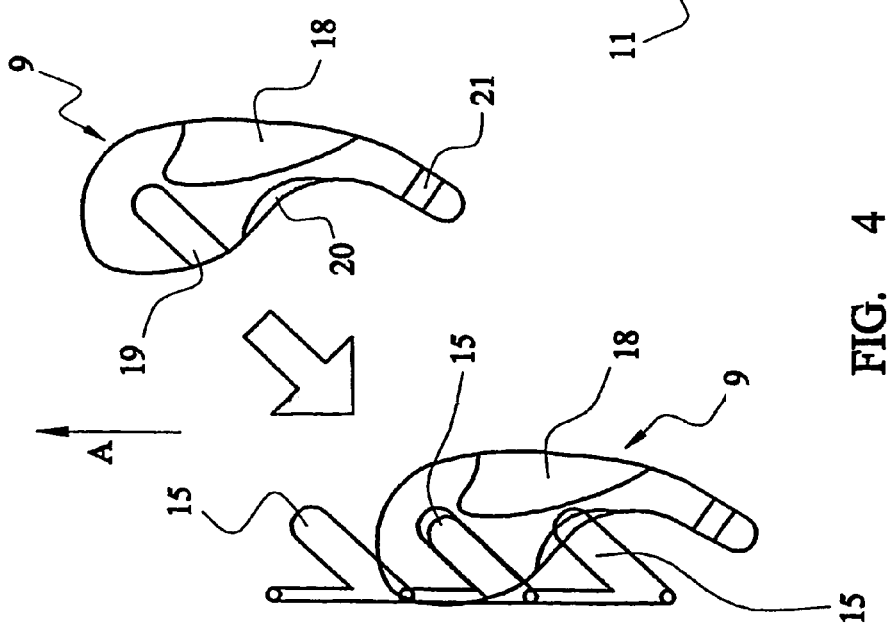
FIG. 3a
FIG. 3b
FIG. 4

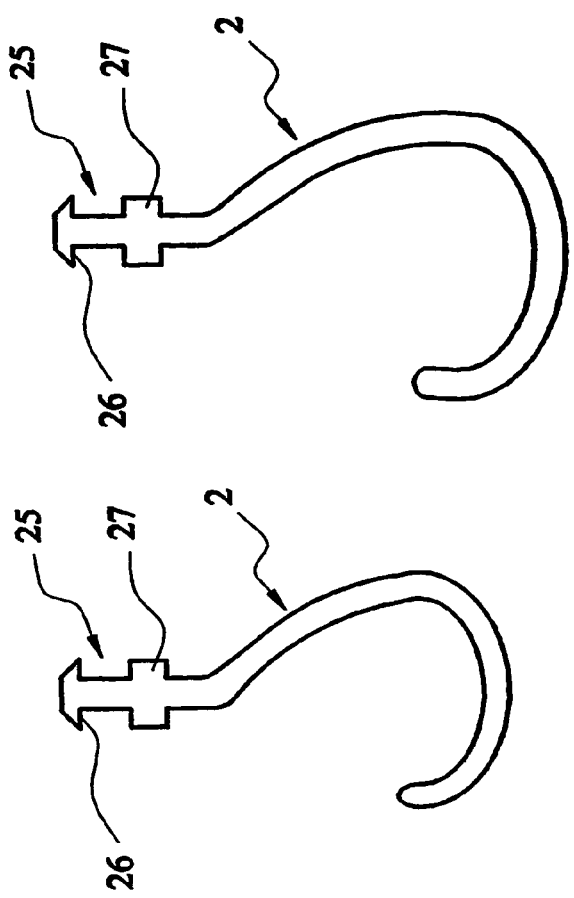
FIG. 9
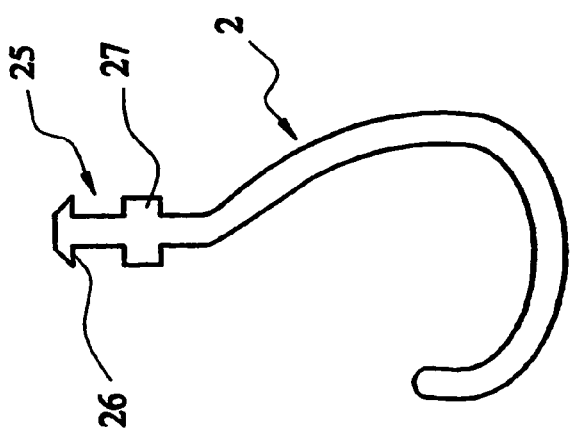
FIG. 10
FIG. 11

SECURING STRAP ARRANGEMENT AND TENSIONER THEREFOR

BACKGROUND OF THE INVENTION

1. Field of the Invention

The present invention relates to a securing strap arrangement and a tensioner arrangement therefor.

2. State of the Art

Elasticated bungee straps are commonly used for securing items such as luggage, surfboards or similar to roof-racks. Such straps typically have hooks or the like at opposed ends for the purpose of attachment and securing.

An improved strap arrangement has now been devised.

SUMMARY OF THE INVENTION

According to a first aspect the invention provides a securing strap arrangement comprising:
a) a resiliently extensible length portion;
b) a substantially non-resiliently extensible length portion including means for varying the effective length of the non-resiliently extensible length portion.

In one embodiment the non-resiliently extensible length portion may comprise a web belt or the like including a buckle, slider or similar arrangement for varying the effective length of the non-resiliently extensible length portion.

In a preferred embodiment, the non-resiliently extensible portion preferably comprises:
i) a tensioner grip to stretch the extensible length portion; and
ii) a tensioner grip locator portion arranged such that tensioner grip is adapted to releasably engage with the tensioner grip locator portion in one of a plurality of location positions, which location positions are spaced in the longitudinal direction of the strap arrangement.

It is preferred that the tensioner grip has one or more engagement formations adapted to matingly engage with one or more complimentary engagement formations of the grip locator portion; the engagement formations of the grip locator portion being spaced in the longitudinal direction of the strap arrangement.

Preferably the engagement formation (or formations) on the grip locator portion comprise like for like formations spaced in the longitudinal direction of the strap.

Preferably the engagement formation (or formations) of one of the grip locator portion or tensioner grip comprises a male formation; the engagement formation on the other comprising a female formation.

Desirably the engagement formations on the grip locator portion and the tensioner grip are correspondingly angled (or inclined) such that as the formations engage from a mouth portion of a female formation to a root portion of a male formation, the tension of the extensible length portion relaxes (preferably relaxes slightly only).

The tensioner grip preferably comprises a recess formation for engagement with, at any one time, one or more selected upstanding locator formations comprising a series of spaced locator formations of the grip locator portion. Beneficially the tensioner grip comprises a hand grip including one or more finger receiving formations.

It is preferred that the securing strap arrangement includes a securing formation proximate one or both ends. This provides that the arrangement may be secured to a roof-rack or the like. Beneficially, the arrangement includes a hook element approximate one or both ends.

The extensible length portion preferably comprises an elastically stretchable/relaxable length portion. The extensible length portion beneficially comprising a plurality of elastically stretchable/relaxable lengths arranged in parallel.

In a preferred embodiment the arrangement preferably further includes a length of substantially inextensible web. Beneficially, the length of substantially inextensible web is provided intermediate the tensioner grip and the extensible length portion.

Additionally or alternatively, the arrangement preferably includes length adjustment means to adjust the overall length of the strap arrangement irrespective of the stretch condition of the extensible length portion.

Beneficially the length adjustment means comprises a buckle connected to a portion of substantially inextensible web, the web feeding through the buckle to a selectable degree to adjust the effective length of the web portion.

According to a further aspect, the present invention comprises a tensioner arrangement for a securing strap arrangement, the tensioner arrangement comprising:
a) an extensible length portion;
b) a tensioner grip to stretch the extensible length portion; and
c) a tensioner grip locator portion arranged such that the tensioner grip is adapted to releasably engage with the tensioner grip locator portion in one of a plurality of locator positions, which location positions are spaced in the longitudinal direction of the strap arrangement.

According to a still further aspect the invention provides a connector device for connecting, releasably, a strap length portion with a stem portion of an end element (such as a hook), the stem portion being matingly received with the connector device and the stem portion and the connector device having complimentary securing formations arranged, in a first configuration to inhibit release of the stem portion and, in a second configuration permitting release or mating of the stem portions. Actuation means being provided for the connector device permitting relative reorientation of the securing formations between the first and second configurations.

BRIEF DESCRIPTION OF THE DRAWINGS

The invention will now be described in a specific exemplary embodiments, by way of example only, and with reference to the accompanying drawings in which:

FIG. 3a is a plan view of a tensioner grip locator length of the strap arrangement of FIG. 1;

FIG. 3b is a side view of a tensioner grip locator length of FIG. 3a;

FIG. 4 shows, in side view, the mating relationship between the tensioner grip and tensioner grip locator length;

FIGS. 9, 10 and 11 show alternative hook connectors.

DETAILED DESCRIPTION OF THE PREFERRED EMBODIMENT

Figure 1:
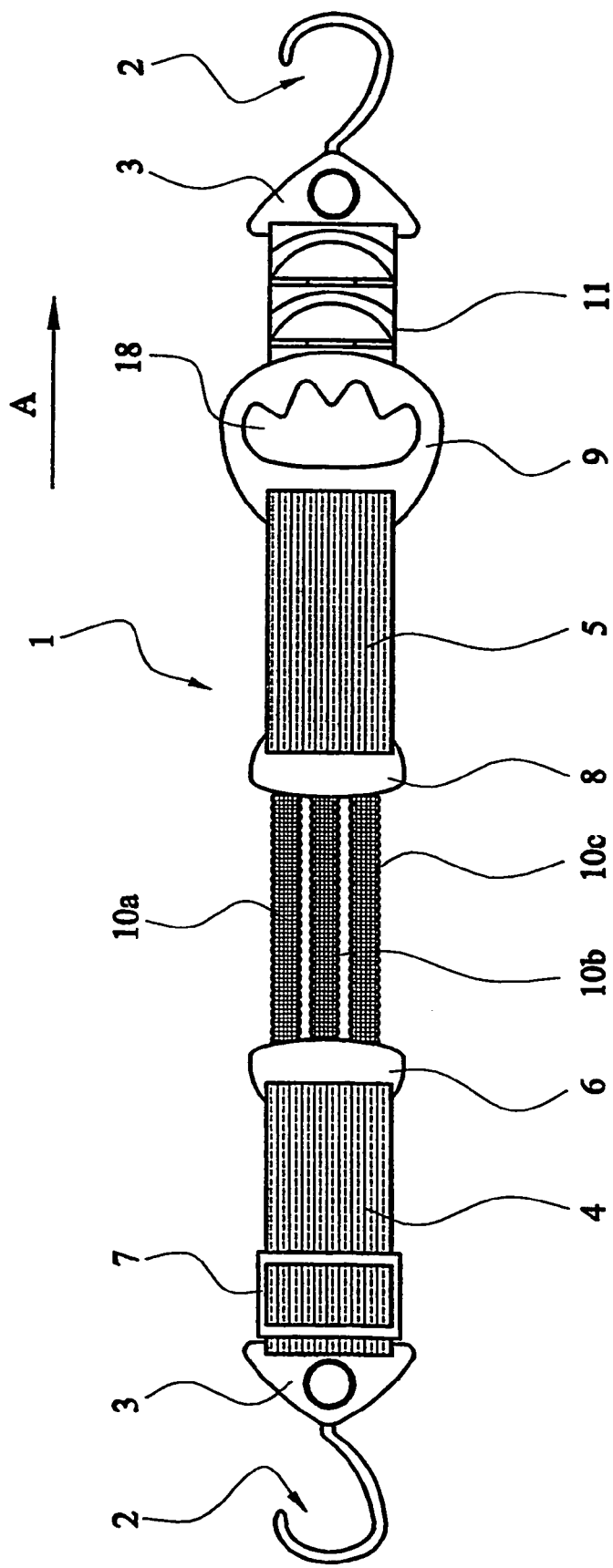
FIG. 1 is a plan view of an exemplary securing strap arrangement according to the invention.
Figure 2A:
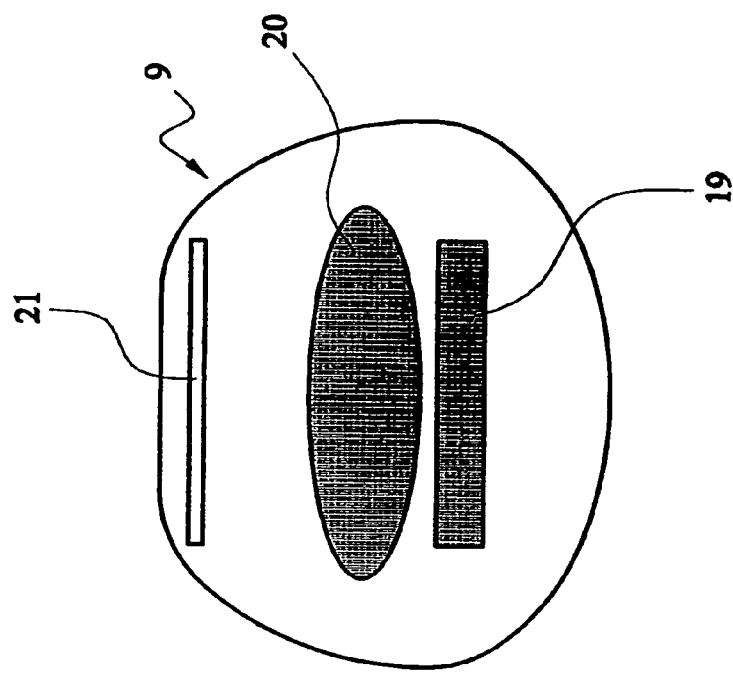
FIGS. 2a, 2b and 2c are upper plan view, side view and an underside view of a tensioner grip comprising the strap arrangement of FIG. 1.
Figure 2B:
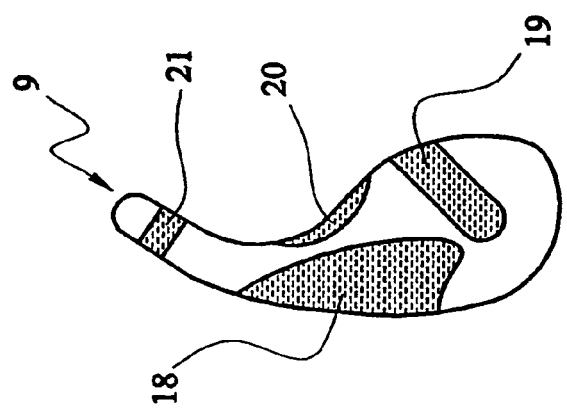
Figure 2C:
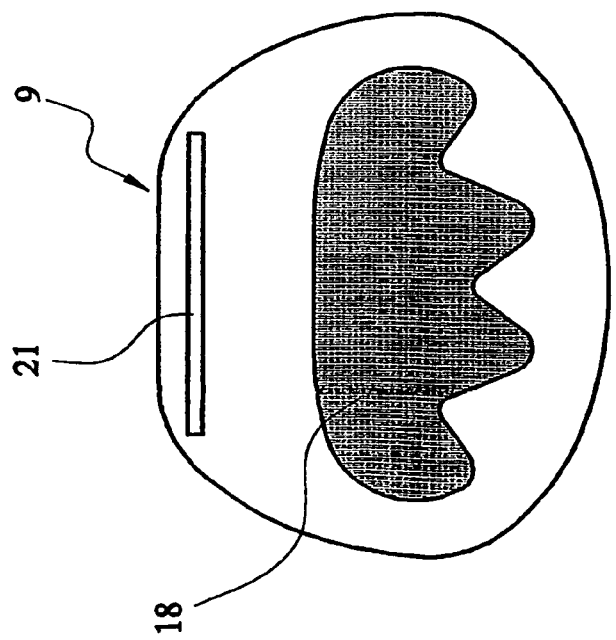
Figure 5A:
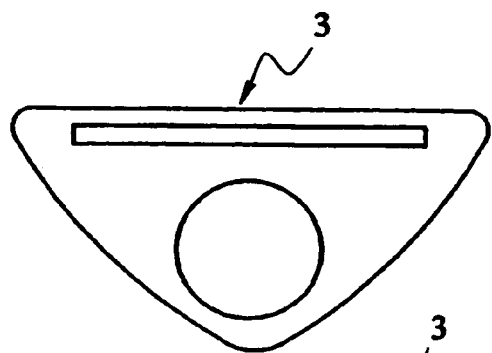
FIGS. 5a and 5b are, respectively, plan and plan cutaway views of a strap connector device according to the invention and which may comprise the strap arrangement shown in FIGS. 1 to 4.
Figure 5B:
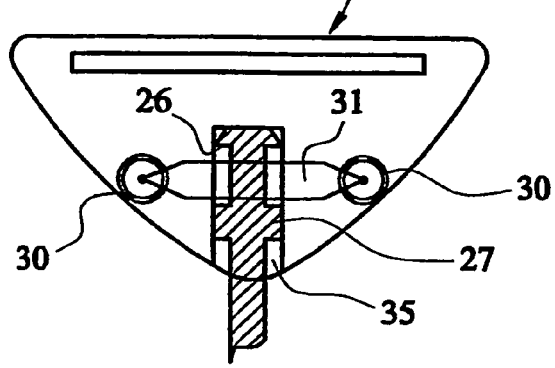
Figure 6:
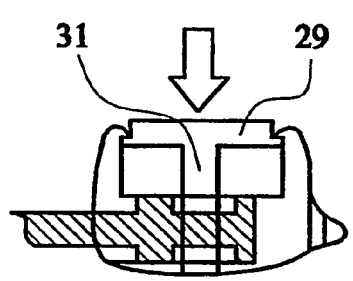
FIG. 6 is a side view of the strap connector device of FIGS. 5a and 5b.
Figure 7:
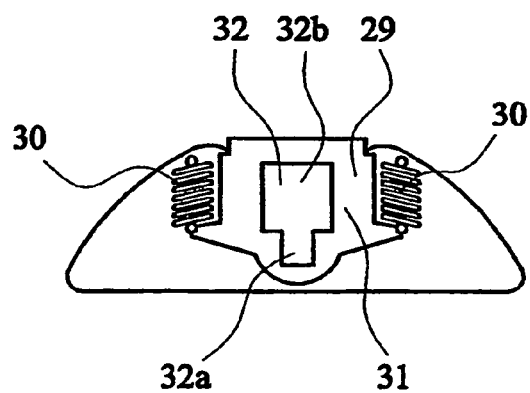
FIG. 7 is a cutaway sectional view of the strap connector device of FIGS. 5a, 5b and 6.
Figure 8:
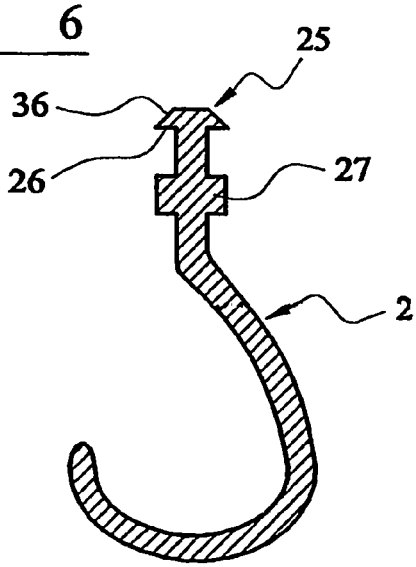
FIG. 8 is a side view of a hook connector to be received by the connector arrangement of FIGS. 5a to FIG. 7.

Referring to the drawings, and initially FIG. 1 in particular, there is shown a securing strap arrangement (generally designated 1) which may be used for securing items (for example surfboards, packing cases, etc to a roof-rack). The strap arrangement 1 includes at opposed ends hook connectors 2 connected to connector devices 3 which will be described in detail hereafter.

The strap arrangement includes substantially inextensible web lengths 4, 5; web length 4 is connected at one end to connector device 3 and at the other end to a moulded plastics clasp connector 6. At one end web length 4 is connected to buckle 7, feeding via an aperture in connector device 3 back through buckle 7 so that buckle 7 is operable to adjust the effective length of web length 4.

Web length 5 is connected at one end to a moulded plastics clasp connector 8 (similar instruction to clasp connector 6) and at the other end to a moulded plastics tensioner grip 9.

Three spaced elastically extensible bungy lengths 10a, 10b, 10c extend between clasp connectors 6 and 8 providing that the overall length of the strap arrangement may be adjusted elastically. The other end of the strap arrangement is provided with a tensioner grip locator length 11, the purpose and nature of which is described in detail hereafter.

Tensioner grip locator length 11, as shown most clearly in FIGS. 3a, 3b and 4 includes a series of locator elements 12 linked edge to edge by pivot formations 13. The locator elements 12 are typically of moulded plastics construction.

Each locator element 12 includes a base portion 14 and an upstanding arcuate locator projection 15 which is inclined at an acute angle to the locator base 14. The inclination of locator projection 15 is from a root portion 16 to a tip portion 17 in a direction away from the extensible bungy lengths 10a, 10b, 10c. As shown most clearly in FIG. 4 and FIGS. 2a, 2b, 2c, the tensioner grip 9 (which is again formed of moulded plastics material typically) includes a finger grip recess 18, receiving recess 19 (for receiving a respective locator projection 15) and a further accommodation recess 20. A slot 21 is provide for receiving the end of inextensible web length 5.

In use, the receiving recess 19 is shaped and dimensioned to snugly matingly receive the locator projection 15. In order to induce the appropriate tension in the strap arrangement overall (by stretching the bungy length 10a, 10b, 10c to their maximum limit for securing) the tensioner grip portion 9 is pulled over the series of spaced locators 15 (in the direction of arrows A in FIG. 1 and FIG. 4). The recess 19 then locates with the most appropriate locator projection 15 for the tension applied to the strap arrangement overall. The bungee lengths 10a, 10b, 10c relax back slightly retracting the tensioner grip 9 and ensuring snug and secure mating of the relevant locator projection 15 with the receiving recess 19.

As an alternative to the specific embodiment of the grip locator length 11 and tensioner grip 9 shown in the drawings, cooperating elements comprising respective zones of multiplicity of hook and loop type formations (for example VELCRO—Registered Trade Mark) may be used. Other securing arrangement may also be used.

The invention provides that a wide variety of shaped and dimensioned articles can be secured using the strap arrangement (for example to a roof-rack or the like). This is because the overall length of the strap arrangement may be varied greatly (depending upon the length of the locator length 11 between a plurality of effective length configurations), whilst maintaining the elasticity of the arrangement (via bungy lengths 10, 10b, 10c) to provide a resilient securing feature. The effective length is therefore not limited solely by the elasticity of the bungee lengths 10a, 10b, 10c.

A variety of hook connectors 2 may be provided depending upon the nature of the structure (for example a roof-rack) to which the strap is secured. Examples of such hook connectors 2 are shown in FIGS. 9, 10 and 11.

Referring now to FIGS. 5a to FIG. 7, a further novel feature is the hook connector device (generally designated 3) to which the hook connectors 2 are secured, and the means of connection of hook connectors 2. As shown in the drawings, the stem ends 25 of the hook connector are provided with terminal lateral flange projections 26 and, spaced from flange connectors 26, a further lateral stem shoulder projection 27. The hook connector device 3 is provided with an actuator element 29 which is normally biassed to a retracted position by means of resilient springs 30. The actuator element 29 includes a body portion 31 including a central opening 32 shaped to have a more restricted open portion 32a and a less restricted open portion 32b.

The stem end 25 of the hook connector 2 is introduced into the receptor recess 35 of the device 3 such that the tapered portion 36 opposed to flange 26 is forced through the more restricted opening 32a in the body portion 31 of actuator 29. The end 25 is then inhibited from being removed out of the receptor recess 35 because flange 26 abuts against the edge of restricted open portion 32a.

In order to remove the hook connector element 2 from the connector device 3, the actuator 29 is depressed (in direction of arrow B in FIG. 7), permitting flange 26 to be withdrawn via the less restricted open portion 32b in the body portion 31 of actuator 29. This arrangement provides convenient connection of a variety of hooks to the connector device 3 depending upon the framework or other arrangement to which the strap arrangement is to be secured.

There have been described and illustrated herein several embodiments of a securing strap arrangement and corresponding methods of operation. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

The invention claimed is:

1. A securing strap arrangement comprising:
   a) a resiliently extensible length portion;
   b) a substantially non-resiliently extensible length portion including means for varying the length of the substantially non-resiliently extensible length portion;
   c) a first tensioner element and a second tensioner element that cooperate to stretch the resiliently extensible length portion, the second tensioner element releasably engaging the first tensioner element in a user-selected one of a plurality of user-selectable location positions of the second tensioner element which are spaced relative to one another in the longitudinal direction of the securing strap arrangement; and
   d) a securing formation, separate and distinct from the resiliently extensible length portion, the substantially non-resiliently extensible length portion, and the first and second tensioner elements, the securing formation disposed at one or both ends of the securing strap arrangement for securing the securing strap arrangement to another structure.

2. A securing strap arrangement according to claim 1, wherein the first tensioner element has at least one engagement formation adapted to matingly engage with one or more complementary engagement formations of the second tensioner element; the engagement formations of the second tensioner element being spaced in the longitudinal direction of the securing strap arrangement.

3. A securing strap arrangement according to claim 2, wherein the engagement formations of the first and second tensioner elements are correspondingly angled such that as the formations engage from a mouth portion of a female formation to a root portion of a male formation, the tension of the extensible length portion relaxes.

4. A securing strap arrangement according to claim 1, wherein the second tensioner element includes like formations spaced in the longitudinal direction of the strap arrangement.

5. A securing strap arrangement according to claim 1, wherein one of the first and second tensioner elements comprises a male formation; and the other of the first and second tensioner elements comprises a female formation.

6. A securing strap arrangement according to claim 1, wherein the first tensioner element comprises a recess formation for engagement with, at any one time, one or more selected upstanding formations comprising a series of spaced locator formations of the second tensioner element.

7. A securing strap arrangement according to claim 1, wherein the first tensioner element comprises a hand grip including one or more finger receiving formations.

8. A securing strap arrangement according to claim 1, wherein said securing formation comprises a hook element disposed proximate the one or both ends of the strap arrangement.

9. A securing strap arrangement according to claim 1, wherein the resiliently extensible length portion comprises an elastically stretchable length portion.

10. A securing strap arrangement according to claim 1, wherein the resiliently extensible length portion comprises a plurality of elastically stretchable lengths arranged substantially in parallel.

11. A securing strap arrangement according to claim 1, wherein the substantially non-resiliently extensible length portion comprises a length of substantially inextensible web.

12. A securing strap arrangement according to claim 11, wherein the means for varying the length of the substantially non-resiliently extensible length portion comprises a buckle connected to a portion of the substantially inextensible web, the web feeding through the buckle to a selectable degree to adjust the effective length of the web.

13. A securing strap arrangement according to claim 1, wherein the length of substantially inextensible web is provided intermediate the first tensioner element and the extensible length portion.

14. A securing strap arrangement according to claim 1, wherein the means for varying the length of the substantially non-resiliently extensible length portion provides adjustment of the overall length of the strap arrangement irrespective of the stretch condition of the extensible length portion.

15. A securing strap arrangement according to claim 1 including a connector device for releasably connecting with a stem portion of the securing formation, the stem portion being matingly received with the connector device and the stem portion and connector device having complimentary retaing formations arranged, in a first configuration to inhibit release of the stem portion and, in a second configuration, permitting release of the stem portion; actuation means being provided for the connector device permitting relative reorientation of the securing formations between the first and second configurations.

16. A securing strap arrangement according to claim 1, wherein the substantially non-resiliently extensible length portion has a first end disposed opposite a second end, wherein the first end is joined to the resiliently extensible length portion, and wherein offset between the second end and the first tensioner element varies based upon user selection of a given location position from said plurality of user-selectable location positions of releasable engagement between the first tensioner element and the second tensioner element.

17. A securing strap arrangement comprising:

a) a resiliently extensible first portion;

b) a substantially non-resiliently extensible second portion;

c) first and second tensioner elements, the first tensioner element operably coupled to the first portion for stretching the first portion, and the first and second tensioner elements including means for releasably engaging the first tensioner element in a user-selected one of a plurality of user-selectable location positions of the second tensioner element which are spaced relative to one another in the longitudinal direction of the securing strap arrangement; and d) a securing formation, separate and distinct from the first and second portions and the first and second tensioner elements, the securing formation disposed at one or both ends of the securing strap arrangement for securing the securing strap arrangement to another structure.

18. A securing strap arrangement for use by a user comprising:

a) an extensible length portion;

b) a first tensioner element to stretch the extensible length portion; and c) a second tensioner element including means for releasably engaging the first tensioner element in a user-selected one of a plurality of user-selectable location positions of the second tensioner element which are spaced relative to one another in the longitudinal direction of the securing strap arrangement; and d) a securing formation, separate and distinct from the extensible length portion and the first and second tensioner elements, the securing formation disposed at one or both ends of the securing strap arrangement for securing the securing strap arrangement to another structure;

wherein the first tensioner element comprises a hand grip including one or more finger receiving formations adapted to receive at least one finger of the user.

* * * * *